United States Patent
Zanetti

(10) Patent No.: US 6,564,623 B2
(45) Date of Patent: May 20, 2003

(54) METHOD FOR DETERMINING THE TOP DEAD CENTER OF AN INTERNAL COMBUSTION ENGINE

(75) Inventor: Markus Zanetti, Frauenfeld (CH)

(73) Assignee: K.K. Holding AG, Winterthur (SE)

( * ) Notice: Subject to any disclaimer, the term of this patent is extended or adjusted under 35 U.S.C. 154(b) by 0 days.

(21) Appl. No.: 09/733,958

(22) Filed: Dec. 12, 2000

(65) Prior Publication Data

US 2001/0006004 A1 Jul. 5, 2001

(30) Foreign Application Priority Data

Dec. 15, 1999 (CH) .............................................. 2297/99

(51) Int. Cl.⁷ ............................................ G01M 15/00
(52) U.S. Cl. ...................................... 73/117.3; 73/117.3
(58) Field of Search ................................ 73/116, 117.2, 73/117.3; 701/101, 102, 110, 111

(56) References Cited

U.S. PATENT DOCUMENTS

| | | | |
|---|---|---|---|
| 4,606,312 A | | 8/1986 | Nakano et al. |
| 4,744,243 A | * | 5/1988 | Tanaka |
| 5,179,857 A | | 1/1993 | Sonderegger et al. |
| 6,276,319 B2 | * | 8/2001 | Walter et al. ............ 123/90.15 |

FOREIGN PATENT DOCUMENTS

| | | |
|---|---|---|
| EP | 0 170 256 B1 | 10/1990 |
| EP | 0 175 449 B1 | 11/1990 |
| EP | 0 671 618 B1 | 4/1999 |

* cited by examiner

Primary Examiner—Hezron Williams
Assistant Examiner—Monica D. Harrison
(74) Attorney, Agent, or Firm—Barnes & Thornburg

(57) ABSTRACT

With the present method, after calibrating the rotary position transducer employed for direct TDC determination, the pressure curve inside the cylinder and the directly measured TDC timing in various operating states and if necessary different engine-specific parameters are recorded simultaneously, correlated as discrete value pairs and stored as a data set.

With one part of the data set a knowledge-based system is trained and varied till the TDC timing output for all operating states and engine types considered agrees with a TDC time previously measured directly, within the desired accuracy.

To detect the TDC from the pressure curve inside the cylinder with unkown and possibly different engine types, measured pressure values are put into the knowledge-based system unaltered after training, at whose output the required TDC is given.

6 Claims, 6 Drawing Sheets

METHOD FOR DETERMINING THE TOP DEAD CENTER OF AN INTERNAL COMBUSTION ENGINE

BACKGROUND AND SUMMARY OF INVENTION

The invention concerns a method for exactly determining the top dead centre (TDC) of an internal combustion engine from the pressure curve inside the cylinder. The top dead centre (TDC), more exactly the point-at the end of the compression phase, is known to be an important value in the cycle of a reciprocating combustion engine, as for calculating the cylinder power output for example. Determining it directly involves much effort and is relatively inaccurate, especially on multicylinder engines. Accordingly determining the TDC from the pressure curve inside the cylinder has already been suggested—by K. Wehner, "Bestimmung des dynamischen OT aus dem Zylinderinnendruckverlauf von Verbrennungsmotoren", IBZ e.V.; (Innovation and Education Centre, registered association in Germany; published in 1996). This known method compares the pressure curve inside the cylinder calculated with the equation of the ideal adiabatic changes of state with the measured curve; the parameters of the calculated curve are then varied iteratively till adequate agreement with the measured curve is attained. As the final step the TDC calculated with the approximation procedure is then taken over into the measured curve. This method involves a considerable amount of calculation firstly, while secondly it does not take into account the actual conditions during the operation of the engine, such as heat losses of the gas, gas losses (i.e. leakages) and deformations of the engine. Though these errors can be compensated in part with empirical values or mathematical models, this then calls for still more calculation.

The purpose of the invention therefore is to provide a method for determining the TDC from the pressure curve inside the cylinder, demanding relatively little calculation and taking into account the actual engine behavior.

Provided there is a properly trained knowledge-based system, then TDC detection and possibly different engine-specific parameters demand only one measurement of the pressure curve inside the cylinder and input of the pressure values into the knowledge-based system, which has learned to allocate the right TDC to them.

Thus the structure of the knowledge-based system and the training effort can be reduced with engines of one type, such as large-bore diesel engines having the same engine-specific parameters, by using only the pressure curve inside the cylinder for TDC detection in the trained system. To verify whether the knowledge-based system is adequately trained it has proved efficacious to subdivide the quantity of correlated cylinder pressure and TDC time pairs from direct measurement into subquantities, of which one at least is used to check the generalization capability of the knowledge-based system.

The accuracy of the training and TDC detection in "operation" can be raised by defining the course of the pressure inside the cylinder with a time lag in relation to the TDC during the system training, so that the TDC falls into the compression phase and the knowledge-based system is trained for a TDC in this phase, and this deliberate systematic error is then cancelled by the unchanged, trained, knowledge-based system. Furthermore TDC detection by the knowledge-based system is improved if the electrical properties of the measuring arrangement, such as the filter frequency, when recording the pressure curve inside the cylinder and the direct TDC time measurement on the one hand, and on the other hand the engine-specific parameters during operation, i.e. at TDC time detection in unknown operating states and/or untrained machine-specific parameters, are made as identical as possible.

Calculation of the cylinder output may be simplified by combining the pressure curve inside the cylinder with a linear scale in degrees of crank or crankshaft angle (° CA), referenced to the TDC time determined from the pressure in the cylinder. If such a simplification is too inaccurate, the linear scale may be adapted to the shape of the actual curve over the time interval with the help of another knowledge-based system.

The meanings and scope of some of the terms employed in these documents will now be defined:

"Pressure curve inside the cylinder" includes not only the direct measurement of this variable but also other measurable variables depending on it, such as the elongation in a cylinder head bolt (EP-A-0170.256 corresponding to U.S. Pat. No. 4,606,312) or in the cylinder liner (EP-B-0671.618) and the pressure between cylinder head and nut (U.S. Pat. No. 5,179,857) or a length change between two walls of the cylinder head (EP-A-0175.449 corresponding to U.S. Pat No. 4,601,196).

"Different operating points" are obtained by varying the revs per minute, fuel mixture, injection timing, ignition timing, load, charging pressure and/or temperature for example, whereby the temperature is always measured in the equilibrium state, i.e. after starting. Other operating states result from the number of operating hours logged by the particular engine.

"Knowledge-based systems" are artificial neural networks (NN), neuro-fuzzy systems or fuzzy systems for instance. With fuzzy systems the process knowledge is put in selectively, whereas with neuro systems the system must acquire the process knowledge itself from the training phase. The "engine-specific parameters" include geometric dimensions like cylinder bore and piston stroke, as well as compression and possibly other characteristic data of an engine type.

The invention will now be described in more detail with reference to a typical embodiment and the drawing.

Other objects, advantages and novel features of the present invention will become apparent from the following detailed description of the invention when considered in conjunction with the accompanying drawings.

DETAILED DESCRIPTION OF THE PREFERRED EMBODIMENTS

Verification of the new method is performed on a single-cylinder four-stroke petrol (gasoline) engine, with spark ignition by coil. Its bore measured 95 mm, stroke about 9 cm, and compression ratio about 10:1.

Figure 1:
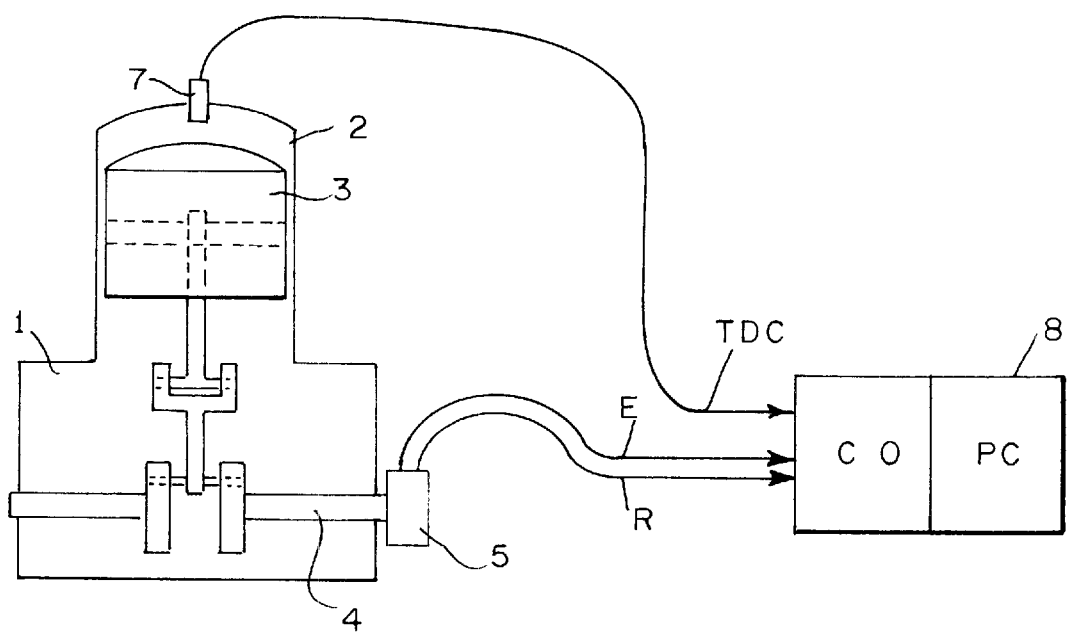
FIG. 1 shows schematically an arrangement for direct measurement of the TDC by means of a capacitive sensor with the engine being turned over.

FIG. 1 shows the engine schematically with a cylinder 2 in which a piston 3 is able to move. This is connected to a crankshaft 4, which at its right-hand end is fitted with a crank angle sensor or rotary position transducer 5. This is a commercially available device of the asignee with the type designation 2612. The transducer 5 gives one signal called the reference signal R at every revolution of the shaft 4. As second signal a signal E is generated in the rotary position transducer 5, which starting from a reference signal (°CA)— as the zero so to speak—generates an angle mark in the form of a rectangular pulse for each degree of crank angle (°CA), thus enhancing the measuring accuracy in the event of speed fluctuations on shaft 4 during a revolution for example.

Fitted in the cylinder head is another sensor 7, which in FIG. 1 is a capacitive sensor for directly measuring piston position and direct TDC measuring. Its signal is designated TDC. This sensor 7 too is a product of the assignee and obtainable under the type designation 2629. It can be fitted only with piston 3 turned over, otherwise ignition would destroy it.

All three signals R, E and TDC are led to a signal processing and display unit 8 for instance, which in this example includes a commercial digital cathode-ray oscilloscope CO and a computer PC. In this, to obtain high resolution and thus secure the necessary accuracy of the arrangement, the time signals E and R from the rotary position transducer and the TDC or piston position signal are scanned with a multiple, for example some ten thousand pulses per revolution of shaft 4. These individual pulses are subdivided in the oscilloscope CO and then transmitted to the computer PC, in which the allocation of TDC time from the TDC sensor to the transducer signals E and R is performed. These measurements with sensor 7 while the engine 1 is turned over serve to calibrate the rotary position transducer 5 and the individual pulses derived from its time signals E and R with regard to the TDC timing.

Figure 5:
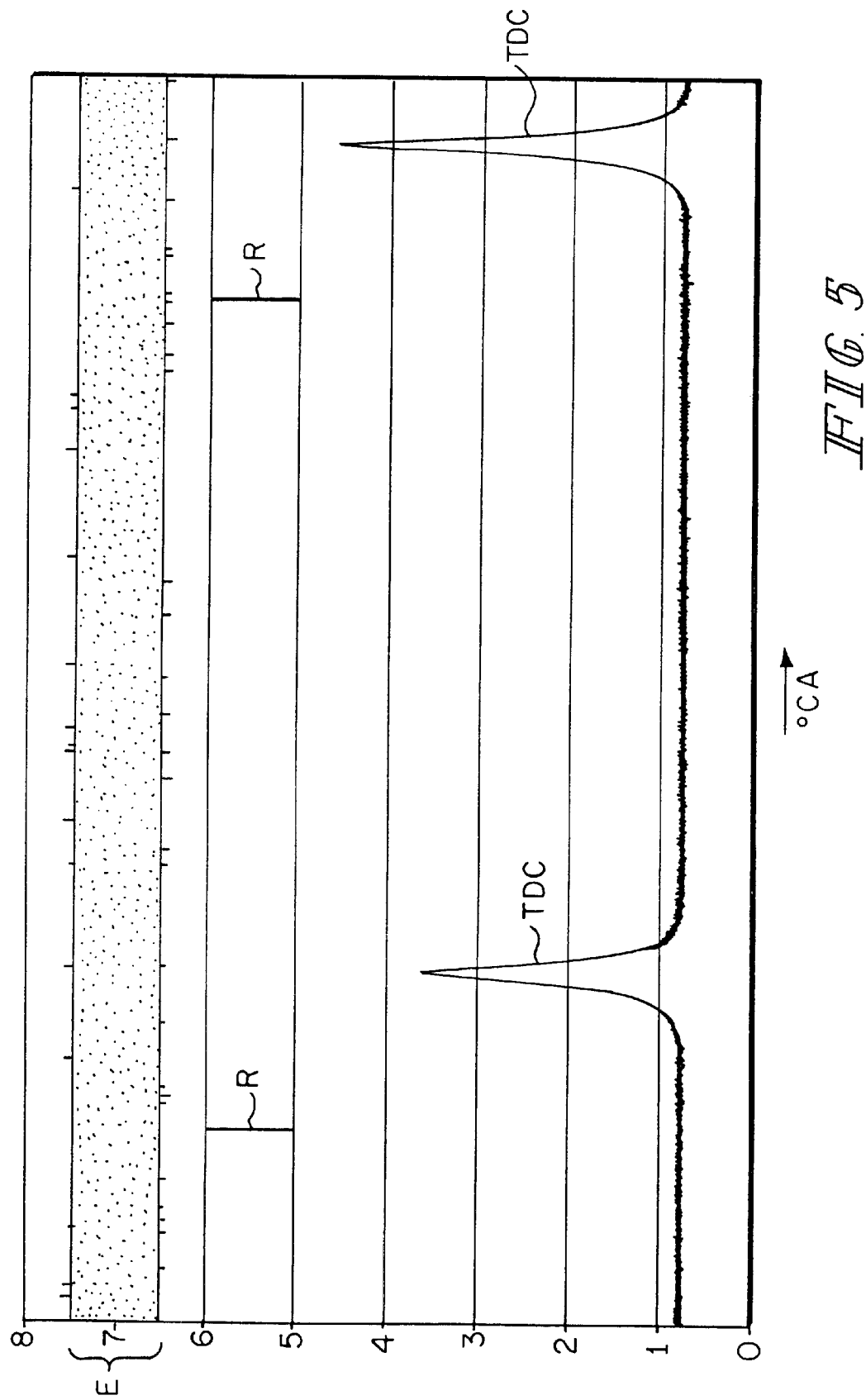
FIG. 5 is the plot of a digital oscilloscope for a measuring series with the arrangement in FIG. 1.
Figure 6:
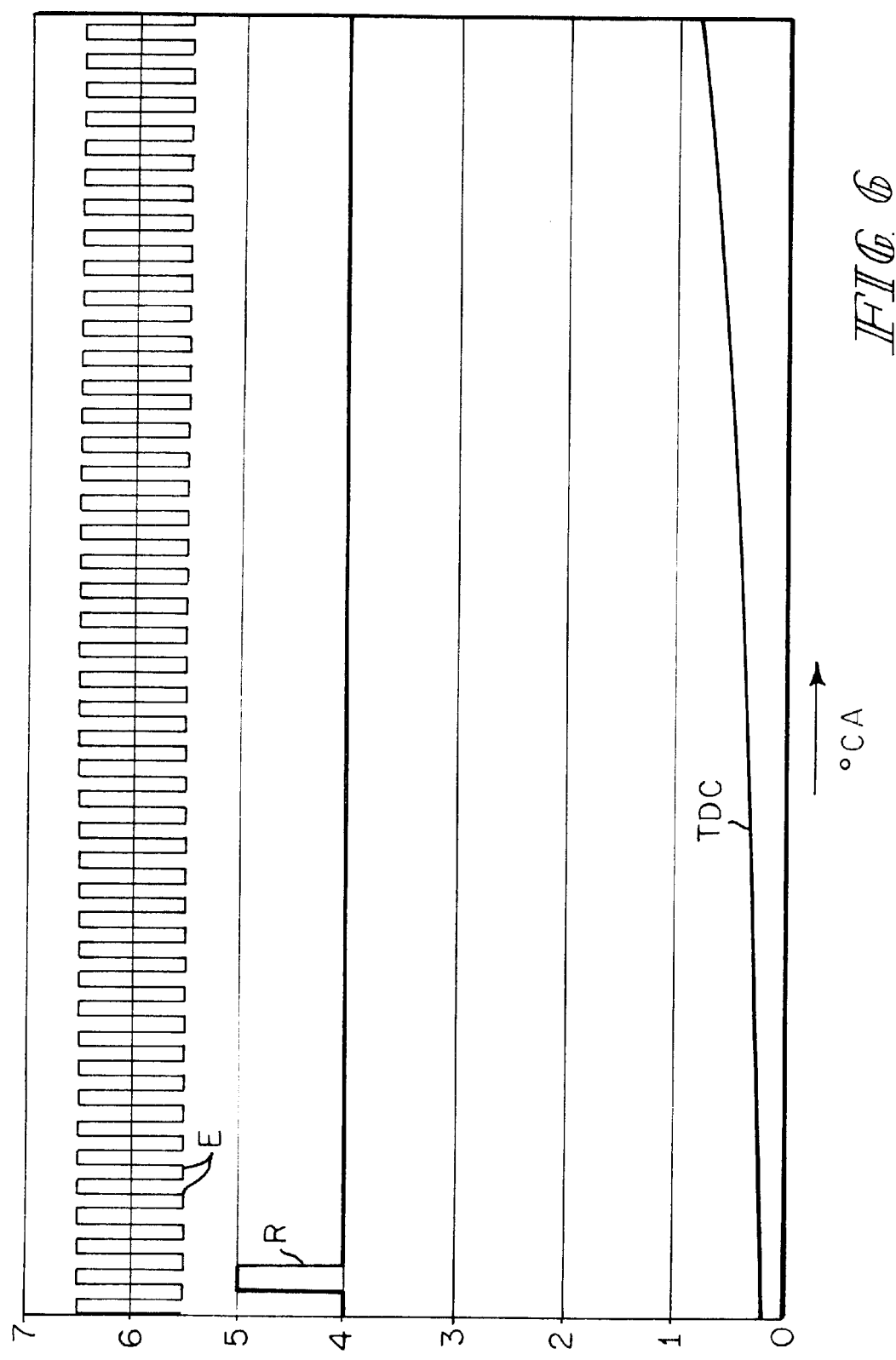
FIG. 6 is an enlarged detail from FIG. 5.

The various signals E, R and TDC are shown in FIGS. 5 and 6. Plotted horizontally in these diagrams is the time scale in degrees of crank angle (° CA). The bottommost curve in FIG. 5 represents the curve of the TDC signal measured by the sensor 7 in digitized individual values; the first maximum is to be allocated to the TDC of the compression phase, and the second peak to the low-pressure TDC after the exhaust expulsion of the four-stroke engine.

The signal above this, appearing as a single pulse, is the reference signal R which indicates the zero at a revolution of the shaft 4.

At the top in FIG. 5 is a solid band: the so-called incremental signal which is the mentioned angle or time signal E of the rotary position transducer 5. The enlargement or time stretching in FIG. 6 shows the resolution of this band into the time signals E of the transducer 5. Also plotted is the signal R and a detail from the TDC signal.

Figure 2:
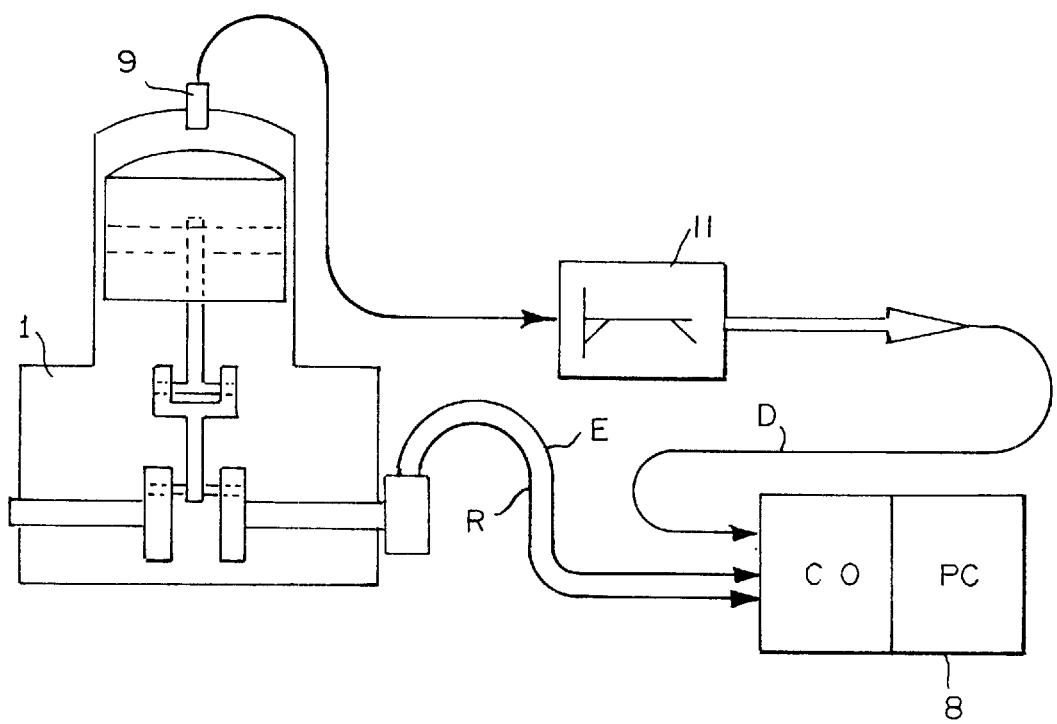
FIG. 2 shows in similar presentation an arrangement for recording measuring data, allocating a pressure value to each time or crank angle and storing these as correlated digital pairs.

In the arrangement according to FIG. 2, for recording measured data to train and verify the generalization capability of the neural network (NN) 10 employed as knowledge-based system (FIG. 3), the sensor 7 for direct TDC measurement is replaced by a pressure sensor 9, which again is a product obtainable from the assignee under the type designation 7061. To make the electrical conditions or properties during training and use for the neural network as identical as possible, a bandwidth limiter 11 with properties as identical as possible to those in the target system is provided in the path for the pressure signal D, before the signal D reaches the oscilloscope CO. In the latter the measured pressure curve is likewise resolved into digital individual values and stored with the associated values of the rotary position transducer signals E and R in a storage unit. The measured data recording, value pairing and data set processing and storage are performed for a number of different operating states; after a processing of the data pairs in the computer PC, for each pressure signal D only the TDC statement "yes" or "no" is stored in the form of digital values "1" or "0". With TDC "yes" the time after TDC is designated, with TDC "no" the time before TDC. The TDC time in the data pair is thus exactly the instant when the change from TDC "Yes" to TDC "no" takes place.

Figure 7:
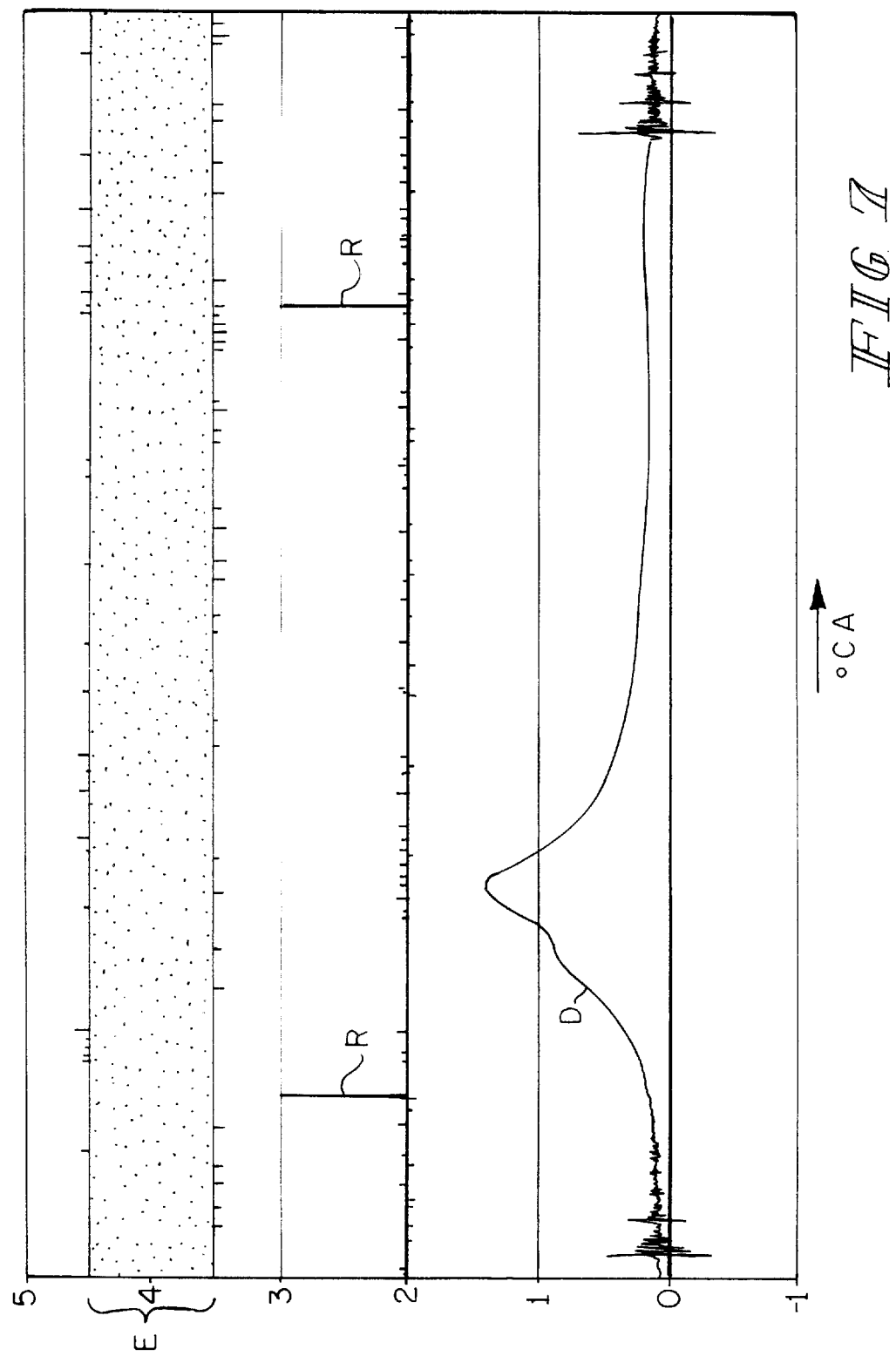
FIG. 7 is a similar plot of measurements recorded with the arrangement in FIG. 2.

An example of such measured data recording is shown in FIG. 7. Here, as in FIG. 5, the pressure curve D, the reference signal R and the band of the time or increment signal E are plotted against time—again in degrees of crank angle (° CA).

Of the quantity of stored data sets from the measured data recording, only a part is now used, embodying part of the measured operating states for training the neural network 10, which is accomplished typically in the PC. The NN 10 employed may be described, not as a limitation but merely as an example probably capable of further optimization. It is a so-called feedforward network with 70 input neurons, two concealed or hidden layers of which the first has 6 and the second 15 neurons, and one output neuron. It is trained by the familiar back propagation learning method with a likewise familiar learning program (MatLab). The sigmoid function of the hyperbolic tangent serves as output or activation function for all neurons alike.

The training of network 10 is prolonged till the error of the TDC detection is less than a preset limit for all operating states considered.

The trained network 10 is now verified for its generalization capability. For this check the NN 10 is fed with the rest of the stored data sets from the measured data recording, i.e. with data that have not been used for training purposes.

For every operating state not trained but measured in the measured data recording, whose pressure signal and TDC value pairs have been stored, the stored pressure values are put onto the input neuron of the trained NN 10 but which is left unchanged after the training, so that its output neuron then issues TDC signals detected from the values of the pressure signal D for each of these operating states, and compares them with the associated stored pressure signal and TDC value pair "yes" or "no".

Figure 8:
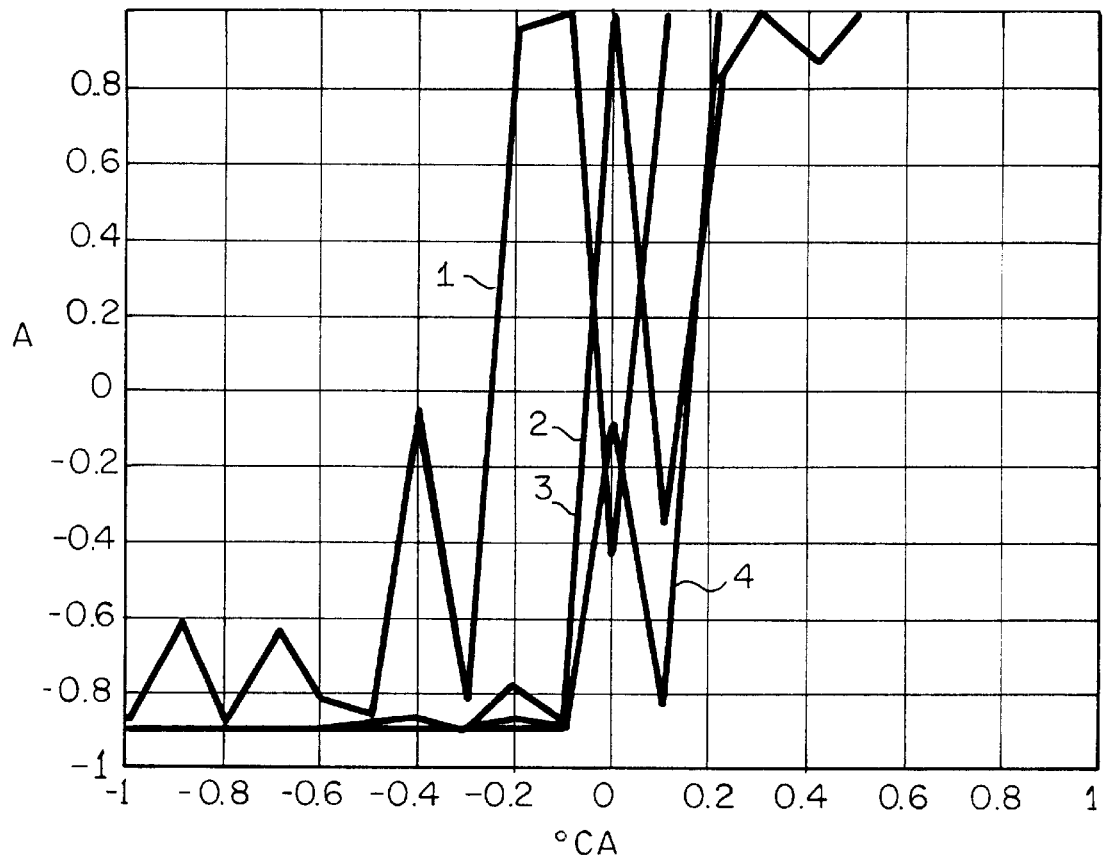
FIG. 8 plots a number of TDC determinations in operating states for which the neural network had not been trained previously. Here again the TDC detection is referenced to the directly measured TDC as zero (FIGS. 1 and 5).

From FIG. 8, which shows the output function A of the NN 10 related to the directly measured TDC as zero, it can be deduced that TDC can be detected from the pressure signal D with an accuracy of 0.5° CA for untrained operating states. This accuracy is adequate for many purposes, though it can be enhanced further by further optimization of the system. From the measured curves in FIG. 8 for the output function A of the unaltered, trained NN 10 for a few untrained operating states, it is evident that TDC is reached when the function value A=+0.9 is first reached or exceeded.

As the pressure curve immediately around TDC is relatively stochastic, for the internal processing and allocation of the pressure values D and the incremental signals E the pressure signals D may be delayed in the computer by a defined lag by means of a FIFO storage in familiar manner, so that the TDC timing coincides with the steeper slope of the compression phase. Needless to say, this systematic error is eliminated again during use after detecting the TDC, likewise in the computer.

Figure 3:
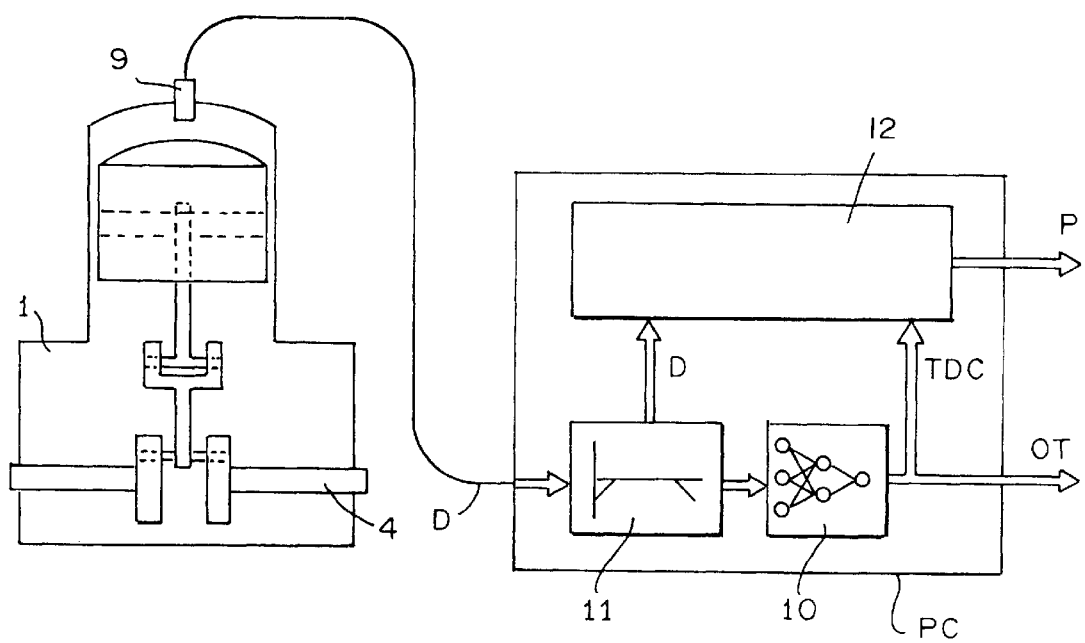
FIG. 3 shows similarly again an arrangement for determining the TDC solely from the pressure inside the cylinder, using a trained, knowledge-based system, here a neural network (NN), and for calculating the cylinder output from the TDC obtained.

In subsequent "operation" the measuring arrangement according to FIG. 3 serves TDC detection with unknown operating states. As sole transducer it contains the pressure sensor 9, which delivers the pressure signal D and leads it via the bandwidth limiter 11 which is as identical as possible with the signal of the training data recording, to the NN 10 unaltered after training which determines the TDC timing from the pressure curve for each operating state.

From the pressure signal D and the TDC detected with its help, the power output of the cylinder 1 may be calculated in the familiar manner. This is done in a further calculating unit 12 of the measuring arrangement in FIG. 3; the unit 12 delivers the calculated output as the signal P (FIG. 3).

Figure 4:
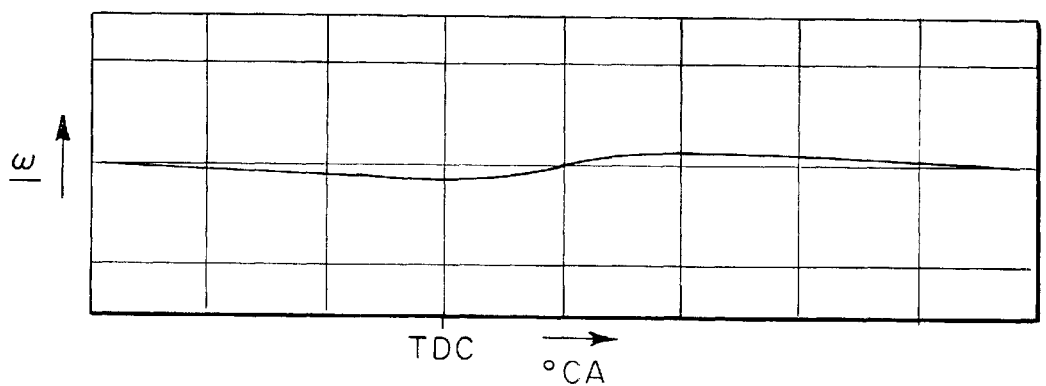
FIG. 4 plots the fluctuating rotational velocity ω of the crankshaft around TDC during compression and after ignition. The crank angle is related to the TDC time.

In the simplest case a linear time scale in ° CA is assumed, i.e. a constant angular velocity ω for the revolutions of the crankshaft 4, this linear scale being related to the "detected" TDC timing. As however the measurement of the angular velocity ω (ordinate) plotted in FIG. 4 against the crank angle CA related to TDC (abscissa TDC=0) shows, this simplification is not quite correct because the angular velocity ω is retarded during the compression phase and accelerated after TDC, giving rise to an undulating curve. If therefore the simplifying assumption should not be admissible, with the help of a further knowledge-based system the graduated scale can be adapted to the actual angular velocity curve.

If direct TDC or piston position measurements and measured data recordings are performed on different engine types having different engine-specific parameters (such as different geometric dimensions like piston stroke and cylinder bore, but also different compression and/or other varying characteristic data), and these engine-specific variables are put into the knowledge-based system via input neurons before training, together with the internal pressure values D for various operating states, so that these variables can be drawn upon for training, then the TDC detection in the described example may be extended to detect the TDC on all engine types considered. Of course this requires more training effort, but the method according to the invention is not rendered impossible. In this way a knowledge-based system once trained can be used to determine the TDC or the cylinder power output of a variety of engine types solely from the curve of the pressure inside the cylinder, for large-bore marine and generating engines, goods and passenger vehicle engines, and even small engines as on lawn mowers.

Although the present invention has been described and illustrated in detail, it is to be clearly understood that the same is by way of illustration and example only, and is not to be taken by way of limitation. The spirit and scope of the resent invention are to be limited only by the terms of the a ended claims.

What is claimed is:

1. A method for exactly determining the top dead center of an internal combustion engine having a piston, cylinder, and crankshaft from pressure inside the cylinder, comprising the steps of:

directly measuring the top dead center as a function of crankshaft angle;

measuring pressure values in the cylinder as a function of crankshaft angle for selected operating points of the engine;

correlating and storing the respective pressure value and top dead center measurements as digitized value pairs in a data set;

inputting the data set into a knowledge based system which produces an output for the occurrence of top dead center;

training the knowledge based system with elements from the data set until the knowledge based system recognizes, from the pressure value inside the cylinder, the associated top dead center obtained from the direct measurement at all the selected operating points; and determining the top dead center from only the measured pressure value in the cylinder, at operating points not used during training, using the knowledge-based system as trained without further training.

2. A method according to claim 1, wherein the curve of the pressure inside the cylinder lags the curve of top dead center measurement defined during the training of the knowledge-based system and used by the trained knowledge-based system for detection of top dead center.

3. A method according to claim 2, wherein the lag is cancelled during operation with the unaltered, trained knowledge-based system.

4. A method according to claim 1, further comprising the step of matching electrical properties during the measuring with electrical properties during training of the knowledge-based system.

5. A method according to claim 1, further comprising the step of combining the pressure inside the cylinder with the associated top dead center measurement determined from the pressure inside the cylinder in order to calculate power in the cylinder.

6. The method as in claim 1, wherein the inputting step further includes inputting engine-specific parameters into the knowledge based system.

* * * * *